Aug. 10, 1965     F. KUGEL     3,199,372
DRIVE MEANS FOR PLURAL AXLES OF A VEHICLE
Filed June 7, 1961
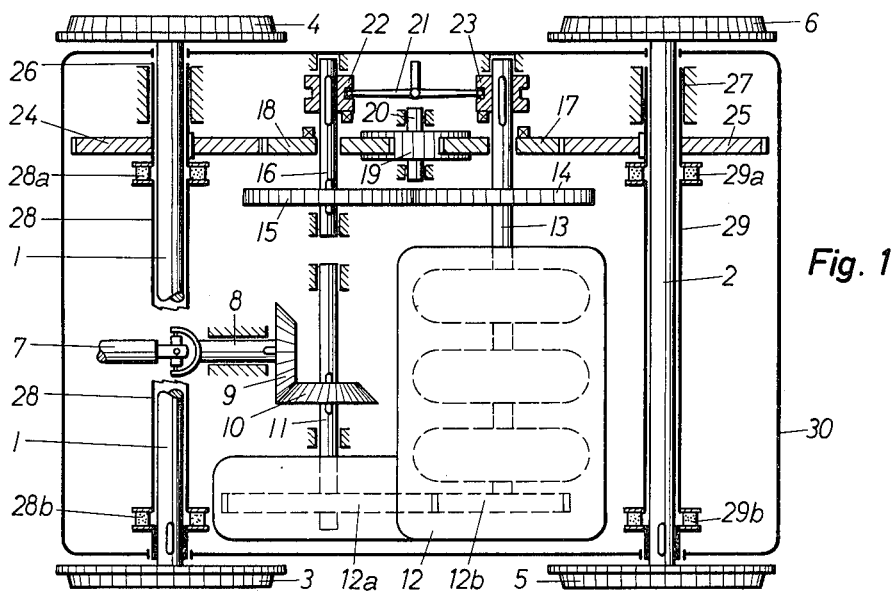
INVENTOR.
Fritz Kugel

United States Patent Office 3,199,372
Patented Aug. 10, 1965

3,199,372
DRIVE MEANS FOR PLURAL AXLES OF A VEHICLE
Fritz Kugel, Heidenheim (Brenz), Germany, assignor to J. M. Voith G.m.b.H., Heidenheim (Brenz), Germany
Filed June 7, 1961, Ser. No. 115,436
Claims priority, application Germany, June 10, 1960, V 18,786
7 Claims. (Cl. 74—665)

The present invention relates to an arrangement for the common drive of at least two adjacent driving axles of a vehicle, especially rail vehicle.

It is an object of the present invention in connection with the common drive of a plurality of driving axles of a vehicle, especially of the truck of a rail vehicle, to arrange the driving elements of the driving axles and the reversing transmission pertaining thereto between the driving axles as close as possible in order to reduce the required space for said transmission to a minimum. In this way it will be possible to arrange other units between the driving axles.

It is another object of this invention to provide an arrangement as set forth in the preceding paragraph, which will make it possible to mount a fluid flow transmission composed of a plurality of fluid circuits between the driving axles.

These objects have heretofore not been satisfactorily realized because with heretofore known constructions of the type involved the space between the driving axles, for instance for the fluid flow transmission, the reversing transmission and the drive for the driving axles, was insufficient. The direct drive of the driving axles through the intervention of bevel gear transmissions requires so much space from the very start that it was impossible additionally to mount a fluid flow transmission and a reversing transmission between the driving axles.

A drive of a plurality of adjacent driving axles by means of a gear train has been known which consists only of spur gears with shafts parallel to the driving axles. The motor, in most instances an electric motor, and the drive shaft for said gear train are with the just mentioned construction arranged in the center between the driving axles. This motor which permits a right and left rotation, has relatively small dimensions.

With another heretofore known construction, the spur gear connection to the driving axles has even been arranged outside the chassis frame. With self-propelled rail vehicles of ordinary gauge this arrangement is, however, not advantageous. With the last mentioned two transmission designs, a reversing transmission is not required because the motor itself is reversible.

With a drive comprising at least two adjacent driving axles and including a reversing transmission and preferably a fluid flow transmission comprising a plurality of fluid circuits and preceding said reversing transmission, while the said driving axles are drivingly connected to each other by transmission elements or a gear train which is in continuous driving connection with said driving axles, said transmission elements being composed, at least to the major extent, of intermeshing spur gears with their axes parallel to the driving axles, the above mentioned objects have been realized by employing a transmission known per se as reversing transmission which latter comprises at least two spur gears arranged on parallel shafts and when shifting to reversing position reversing their direction of rotation. With such an arrangement the said spur gears simultaneously serve as transmission elements for the gear train. Inasmuch as the gear or transmission train consists to the major extent of spur gears, it merely forms a narrow band transverse to the driving axles. In this way and due to the fact that the transmission train and the reversing train engage each other, the space requirement is considerably reduced with regard to the previous constructions of the type involved. Inasmuch as two spur gears of the transmission train pertain to the reversing transmission so that said two spur gears so to speak have a double function—in the transmission train and in the reversing transmission— it will be obvious that over the heretofore known transmission constructions not only will there be saved transmission elements but also the degree of efficiency of the vehicle drive will be increased.

For the sake of completeness it may be added that a drive for two adjacent driving axles through the intervention of a bevel gear reversing transmission and spur gears following the latter with shafts parallel to the driving axles has been known. However, aside from the fact that with this known construction the reversing transmission and the spur gear drive are not interrelated, but are arranged separately from each other, it should be kept in mind that the said last mentioned construction lacks a transmission train with spur gears most of which mesh with each other. The arrangement is rather such that the power transmission is effected to the major extent likewise through the shafts of the spur gear transmission. Consequently, the space requirement of the transmission elements is greater than with the arrangement according to the present invention. Thus, with the said last mentioned known transmissions, it is not possible for instance to mount a fluid flow transmission.

With an arrangement according to the present invention the reversing transmission may for instance be so designed that it comprises a drive shaft and a counter shaft parallel thereto. Furthermore, two spur gears respectively mounted on said two shafts may mesh with each other and two further spur gears respectively arranged on said two shafts may be drivingly connected to each other by an intermediate gear. In addition thereto, either each of the spur gears meshing with each other or each of the spur gears drivingly connected through the intermediate gear may be adapted selectively to be coupled to its respective shaft pertaining thereto, the other spur gears which are not adapted selectively to be coupled or disengaged from their respective shafts are fixedly connected thereto for instance by keys. The reversing transmission thus consists of five spur gears which represents the minimum with spur gear reversing transmissions. Of the five spur gears two or three spur gears are simultaneously employed for or form a part of the transmission train interconnecting the driving axles. The space requirement for this reversing transmission is, therefore, extremely small, particularly since the spur gears not employed in the transmission train will require only a minimum of space.

The invention will appear more clearly from the following specification in connection with the accompanying drawings, in which:

FIG. 1 is a diagrammatic illustration of a horizontal section of a truck of a rail vehicle showing the spur gear drive.

FIG. 1a shows a different arrangement of the drive from FIG. 1.

FIG. 2 diagrammatically illustrates a horizontal section through a drive diagram of two driving axles driven through the intervention of Cardan or universal joint shafts for a rail vehicle.

FIG. 2a shows an arrangement of the drive differing from that in FIG. 2.

FIG. 3 shows a sight view of a driving axle arrangement according to FIG. 2, with the driving wheel removed.

Referring now to the drawings in detail and FIG. 1 thereof in particular, the truck illustrated therein comprises two driving axles 1 and 2 and the driving wheel sets 3, 4 and 5, 6. The drive is effected from the motor (not shown) through a Cardan or universal joint shaft 7, a shaft 8, a pair of bevel gears 9, 10 and a shaft 11 to a fluid flow transmission 12 for instance through gears 12a, 12b. In the specific example shown in the drawing, the fluid flow transmission comprises three fluid circuits and three velocity ranges.

The output shaft 13 of the fluid flow transmission simultaneously forms the drive shaft for the reversing transmission. As will be evident from the drawing, shaft 13 has keyed thereto a spur gear 14 meshing with a spur gear 15 keyed to a counter shaft 16 which is parallel to drive shaft 13. Shaft 13 has furthermore freely rotatably mounted thereon a spur gear 17. The counter shaft 16 has likewise freely rotatably mounted thereon a gear 18. The two freely rotatable gears 17 and 18 are drivingly connected through an intermediate gear 19 which is mounted on a shaft 20. Two jaw clutches 22 and 23 are adapted selectively to be engaged and disengaged with the gears 18 and 17 respectively by means of a shift lever 21. In this way it is possible selectively to drivingly connect the gear 17 with shaft 13 or gear 18 with shaft 16 whereby the forward or rearward drive respectively for the truck is made effective.

If the spur gears of the transmission train are drivingly connected to the driving axles and if the outer gears are arranged coaxially with regard to the driving axles, it is possible to cushion the driving axles relative to the vehicle chassis or truck including the transmission train and reversing transmission. This may be done for instance by driving the driving axles from the corresponding outermost gear of the transmission train through a hollow shaft surrounding the driving axles. More specifically, with reference to FIG. 1, it will be noted that the spur gears 17, 18 are in mesh with the spur gears 24, 25 fixedly connected to short hollow shafts 26 and 27 respectively. These hollow shafts which surround the driving axles 1, 2 are connected to the drive wheels 3 and 5 respectively through the intervention of hollow shafts 28, 29 and the resilient blocks 28a, 29a; 28b, 29b, respectively. The truck housing 30 housing the transmission is resiliently journalled relative to the driving axles. The transmission train will in this instance comprise a total of seven gears only.

In order to make possible to arrange the truck illustrated in FIG. 1 at both ends of a rail vehicle without having to change the fluid flow transmission which can be driven in one direction only, there exists the possibility of providing on shaft 11 a bevel gear 10a instead of the bevel gear 10 (FIG. 1a). Although the input direction of rotation of shaft 7 is previously changed by placing the truck at the other end of the vehicle and thereby rotating the truck by 180°, the fluid flow transmission will always be driven in the same direction of rotation. The respective position of the shift lever 21 which previously indicated for instance forward drive, will now, of course, indicate rearward drive.

Referring now to FIG. 2 and FIG. 2a, the drive illustrated therein comprises two driving axles 40, 41 in a vehicle chassis 42. The drive of the input shaft 43 which has both ends thereof extending out of the transmission housing (not shown) is effected through the intervention of a Cardan or universal joint shaft 44 (FIG. 2) or 44a (FIG. 2a) depending on which side the motor output shaft is arranged. A fluid flow transmission 48 with two velocity ranges is adapted to be driven by the bevel gears 45, 46 and shaft 47 as well as gears 48a, 48b. As will be seen from the drawing, the output shaft 49 of the fluid flow transmission 48 has fixedly connected thereto a spur gear 50 which through the intervention of an intermediate gear 51 drives a spur gear 53 keyed to a shaft 52. Furthermore, a gear 54 is freely rotatably mounted on the output shaft 49. The freely rotatable gear 54 meshes with a gear 55 which is freely rotatable on shaft 52. The freely rotatable gears 54, 55 are adapted by means of jaw clutches 70, 71 operable by a shift lever 72 selectively to be coupled to shafts 49 and 52 respectively, or if desired, the gears 54, 55 may remain disengaged from shafts 49 and 52. It will thus be evident that the gears 54, 55 may selectively occupy an idling position or a position for forward or rearward drive.

As will be recalled in connection with Fig. 1, the arrangement illustrated therein has hollow Cardan shafts 28, 29. If it is desired to avoid these hollow Cardan shafts while maintaining the important cushioning of the transmission parts, the arrangement according to FIG. 2 may be selected. According to this arrangement, the outermost gears of that portion of the transmission train which consists only of spur gears meshing with each other, may have connected thereto one end of a Cardan or universal joint shaft which is adjacent to the driving axle and at least approximately parallel thereto, whereas the other end of said Cardan or universal joint shaft is drivingly connected to the driving axle through the intervention of a pair of spur gears. In this connection, it is advantageous to arrange the said last mentioned two spur gears at that longitudinal side of the vehicle or truck which is remote from said gear train. In this way, a Cardan shaft will be obtained which is as long as possible which fact has a favorable influence on the uniformity of the speed transmission. The Cardan shaft between the gear train on one side thereof and the pair of spur gears on the other side thereof makes possible a vertical displacement of these two parts relative to each other. The spring suspension of the chassis 42 with respect to the driving axles 40, 41 is shown diagrammatically in FIG. 3. This suspension comprises a spring 42a interposed between the chassis 42 and a guide piece 42b, which is arranged on the driving axle 40 or 41 and is guided in a recess 42c of the chassis 42.

It is furthermore suggested with rail vehicles to cushion those transmission parts relative to the rail which, when looking in the direction of power flow, precede the Cardan shafts, whereas the gears which directly cooperate with the driving axles should not be resiliently journalled.

More specifically, with reference to FIG. 2, the spur gears 54, 55 mesh with further spur gears 56 and 55a respectively, and gears 55a meshes with gear 57. The shafts 58 and 59 of gears 56 and 57 are drivingly connected with the driving axles 40 and 41 respectively through Cardan shafts 60 and 61, shafts 62 and 63, and pairs of spur gears 64, 65 and 66, 67 respectively. The Cardan shafts 60, 61 have the greatest possible length because the spur gear train 54–57 is arranged at one longitudinal side of the vehicle, whereas the spur gear pairs 64–67 are arranged at the other longitudinal side of the vehicle. The pairs of spur gears 64, 65 and 66, 67 are mounted in housings 68, 69 respectively journalled on the driving axles. The vehicle frame 42 including the fluid flow and reversing transmissions and also including the transmission train 54–57 is resiliently mounted with regard to the driving axles, whereas the spur gear housings 68, 69 are not resiliently mounted.

If the transmission consists of spur gears only, the number of the spur gears required for obtaining the same direction of rotation of the driving axles will always be an uneven number. If three spur gears of said number pertain to the reversing transmission, a particularly low number of spur gears will be necessary, in this instance for example a total of seven spur gears for the reversing transmission and also for the driving connection of the two driving axles.

It is furthermore advantageous to arrange the spur gears of the transmission train and preferably also the remaining spur gears of the reversing transmission at one longitudinal side of the vehicle or truck, approximately in the neighborhood of the driving wheels on one longitudinal side. In this way, between the driving axles there will be provided so much space that additional units may there be arranged, for instance the fluid flow transmission itself if the driving axles are driven through the intervention of a fluid flow transmission. The arrangement of such units, especially of a fluid flow transmission, between the driving axles, and in spite of only a small distance between the axles will have the following advantages:

The available useful space of the vehicle above the floor will be enlarged. This is of importance particularly in view of the continuously increasing driving power and the increase in the driving motors inherent thereto. In order to obtain high driving power, it is possible for instance in conformity with the present invention to provide a plurality of fluid flow transmissions respectively between two driving axles. Furthermore, the center of gravity of the vehicle is lowered.

With the space saving arrangement of a transmission train and reversing transmission between the driving axles in conformity with the present invention, with rail vehicles a particularly advantageous design will be obtained when the housing of the rigidly journalled transmission elements of the transmission train, of the reversing transmission and, as the case may be, of the fluid flow transmission, is formed by the frame of the truck or the main chassis of the vehicle. In this way, the number of the housing walls will be reduced whereby a still more compact design and reduction in the weight and costs of the drive will be obtain.

It is, of course, to be understood that the present invention is, by no means, limited to the particular constructions shown in the drawings but also comprises any modifications within the scope of the appended claims.

What I claim is:

1. In an arrangement for commonly driving at least two adjacent parallel driving axles of a vehicle, especially of the truck of a rail vehicle: a gear train continuously drivingly interconnecting said driving axles and rotatable on axes parallel to said driving axles, reversing transmission means including first, second and third shafts parallel to said driving axles, a first group of spur gears comprising first, second and third spur gears, said first and third spur gears being rotatably mounted on said first and third shafts respectively and both meshing with said second spur gear, said second spur gear being mounted on said second shaft, a second group of spur gears comprising intermeshing fourth and fifth spur gears drivingly connected to said first and third shafts respectively, shiftable clutch means operable for selectively drivingly connecting either one of said first and third spur gears to its respective shaft, one of said two groups of spur gears forming part of said gear train, an input shaft, an output shaft, and a fluid flow transmission located in the space between said two driving axles and comprising a plurality of fluid circuits interposed between and drivingly connected to said input and output shafts, said output shaft being integral with one of said first and third shafts.

2. In an arrangement for commonly driving at least two adjacent parallel driving axles of a vehicle, especially of the truck of a rail vehicle: a gear train continuously drivingly interconnecting said driving axles and rotatable on axes parallel to said driving axles, reversing transmission means including first, second and third shafts parallel to said driving axles, a first group of spur gears comprising first, second and third spur gears, said first and third spur gears being rotatably mounted on said first and third shafts respectively and both meshing with said second spur gear, said second spur gear being mounted on said second shaft, a second group of spur gears comprising intermeshing fourth and fifth spur gears drivingly connected to said first and third shafts respectively, shiftable clutch means operable for selectively drivingly connecting either one of said first and third spur gears to its respective shaft, one of said two groups of spur gears forming part of said gear train, an input shaft, an output shaft, and a fluid flow transmission located in the space between said two driving axles and comprising a plurality of fluid circuits interposed between and drivingly connected to said input and output shafts, said output shaft being directly coupled to one of said first and third shafts.

3. An arrangement according to claim 2 in which all of the gears of said gear train are arranged near one longitudinal side of said vehicle.

4. An arrangement according to claim 2 in which said gear train includes a terminal gear adjacent each axle, and a Cardan shaft connected to each axle and the said terminal gear adjacent thereto to effect driving connection of each axle to the said gear train.

5. An arrangement according to claim 4 in which each Cardan shaft is substantially parallel to the adjacent axle and is connected at one end to the adjacent said terminal gear, another gear on the other end of each Cardan shaft, and a gear fixed to each axle and meshing with the said other gear on the adjacent Cardan shaft.

6. An arrangement according to claim 5 in which said gear train is arranged substantially in a plane near one end of said axles whereas the said other gears on said Cardan shafts and the gears meshing with said other gears and fixed to said driving axles are arranged near the other end of said axles.

7. An arrangement according to claim 6 which includes a frame, said spur gear and said first through said fifth shafts being rotatable in the frame, resilient means supporting said frame on said axles, and means supporting the end of each Cardan shaft having said other gear thereon on the adjacent axle for bodily movement therewith relative to the frame.

References Cited by the Examiner

UNITED STATES PATENTS 870,202    11/07    Sponsel _____ 74—361

FOREIGN PATENTS 1,183,881    2/59    France.
1,212,432    10/59   France.
  866,923    5/61    Great Britain.

DON A. WAITE, *Primary Examiner.*